(12) United States Patent
Xu et al.

(10) Patent No.: US 9,798,591 B2
(45) Date of Patent: Oct. 24, 2017

(54) METHOD, APPARATUS, AND CHIP FOR IMPLEMENTING MUTUALLY-EXCLUSIVE OPERATION OF MULTIPLE THREADS

(71) Applicant: Huawei Technologies Co., Ltd., Shenzhen (CN)

(72) Inventors: Weizhi Xu, Beijing (CN); Zhimin Tang, Beijing (CN); Zhimin Zhang, Beijing (CN); Fenglong Song, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 6 days.

(21) Appl. No.: 14/872,946

(22) Filed: Oct. 1, 2015

(65) Prior Publication Data

US 2016/0019100 A1 Jan. 21, 2016

Related U.S. Application Data

(63) Continuation of application No. PCT/CN2014/070959, filed on Jan. 21, 2014.

(30) Foreign Application Priority Data

Apr. 1, 2013 (CN) .......................... 2013 1 0112333

(51) Int. Cl.
  *G06F 9/46* (2006.01)
  *G06F 12/00* (2006.01)
  (Continued)

(52) U.S. Cl.
  CPC ............. *G06F 9/526* (2013.01); *G06F 9/52* (2013.01); *G06F 12/1466* (2013.01)

(58) Field of Classification Search
  None
  See application file for complete search history.

(56) References Cited

U.S. PATENT DOCUMENTS 5,175,861 A 12/1992 Hara et al.
6,973,549 B1 12/2005 Testardi
(Continued)

FOREIGN PATENT DOCUMENTS

CN 101908034 A 12/2010
CN 102141974 A 8/2011
(Continued)

OTHER PUBLICATIONS

Lee, Sang-Kwon, et al., "Design and Implementation of a Multi-Threaded TMN Agent System," IEEE, Sep. 21, 1999. pp. 332-337.

*Primary Examiner* — Lewis A Bullock, Jr.
*Assistant Examiner* — Melissa Alfred
(74) *Attorney, Agent, or Firm* — Slater Matsil, LLP

(57) ABSTRACT

Multiple lock assemblies are distributed on a chip, each lock assembly manage a lock application message for applying for a lock and a lock release message for releasing a lock that are sent by one small core. Specifically, embodiments include receiving a lock message sent by a small core, where the lock message carries a memory address corresponding to a lock requested by a first thread in the small core; calculating, using the memory address of the requested lock, a code number of a lock assembly to which the requested lock belongs; and sending the lock message to the lock assembly corresponding to the code number, to request the lock assembly to process the lock message.

12 Claims, 8 Drawing Sheets

(51) Int. Cl.
    *G06F 13/22*    (2006.01)
    *G06F 9/52*     (2006.01)
    *G06F 12/14*    (2006.01)

(56) References Cited

U.S. PATENT DOCUMENTS

| | | |
|---|---|---|
| 7,739,245 B1 | 6/2010 | Agarwal et al. |
| 2007/0016754 A1 | 1/2007 | Testardi |
| 2007/0124545 A1 | 5/2007 | Blanchard et al. |
| 2007/0150897 A1 | 6/2007 | Leeman, Jr. |
| 2008/0082771 A1* | 4/2008 | Pong ........................ G06F 9/526 |
| | | 711/163 |
| 2009/0254555 A1* | 10/2009 | Balakrishnan .......... G06F 9/455 |

FOREIGN PATENT DOCUMENTS

| | | |
|---|---|---|
| CN | 102567275 A | 7/2012 |
| CN | 102591722 A | 7/2012 |

\* cited by examiner

METHOD, APPARATUS, AND CHIP FOR IMPLEMENTING MUTUALLY-EXCLUSIVE OPERATION OF MULTIPLE THREADS

This application is a continuation of International Application No. PCT/CN2014/070959, filed on Jan. 21, 2014, which claims priority to Chinese Patent Application No. 201310112333.9, filed on Apr. 1, 2013, both of which are hereby incorporated by reference in their entireties.

TECHNICAL FIELD

The present invention relates to the field of computers, and in particular, to a method, an apparatus, and a chip for implementing a mutually-exclusive operation of multiple threads.

BACKGROUND

With development of semiconductor processes, a quantity of transistors that may be integrated on a chip is increasing, and to reduce power consumption and heat dissipation while improving performance, an architecture designer puts forward a thread-level coarse-grained parallel on-chip multi-core/many-core processor. The on-chip multi-core/many-core processor refers to a multi-core/many-core processor integrated on a same chip, and compared with a conventional multiprocessor, the on-chip multi-core/many-core processor has advantages of a higher on-chip bandwidth, a shorter communication distance, and a more rapid transmission speed, so that efficiency of data communication among multiple threads is higher.

However, when multiple threads are executed in parallel, a variable may be shared by the multiple threads. To ensure correctness of program execution semantics, a method for mutually-exclusively operating multiple threads is used, and the method can ensure that when multiple threads perform a read/write operation on shared memory, only one thread exclusively occupies the shared memory at a moment. Performance of the mutually-exclusive operation is very important to an on-chip multi-core/many-core processor, and directly affects a speed of collaborative execution of multiple threads.

A manner for implementing a mutually-exclusive operation in the prior art includes: setting a flag bit in memory outside a chip, where a flag bit 0 identifies that a lock is currently in an idle state, and a flag bit 1 identifies that the lock is currently in an occupied state. The lock is a mechanism that ensures only one thread operation is protected at a moment in multiple threads. When there is a mutually-exclusive operation, multiple small cores on the multi-core/many-core processor poll a same flag bit in the memory, and only when the flag bit is 0, that is, only when the lock is in an idle state, can the thread acquire the lock to further occupy the memory to perform a read/write operation, and at the same time, sets the flag bit to 1. If it is found that the flag bit is 1, the flag bit is queried again after a period of time. Although the method can implement the mutually-exclusive operation, accessing a flag bit outside the chip by a small core on the chip may generates a problem of larger system overheads, and constant polling of the flag bit may also impose a great pressure on an on-chip network.

Another manner for implementing a mutually-exclusive operation in the prior art includes: centrally processing, by using a synchronization management apparatus connected to multiple small cores shown in FIG. 1, mutually-exclusive requests of all small cores on the multi-core/many-core processor, that is, managing, by using the synchronization management apparatus, a lock application message for applying for a lock and a lock release message for releasing a lock that are of each small core, and determining, according to a state of a lock in the synchronization management apparatus, whether to obtain a lock or wait for a lock. The method can avoid larger system overheads generated by accessing a flag outside the chip, and avoid polling of the flag bit, but because all threads are managed by one synchronization management apparatus, increasing of a quantity of threads may cause a congestion phenomenon prolong a wait time of the threads, and reduce a speed of collaborative execution of the threads.

SUMMARY

Embodiments of the present invention provide a method, an apparatus, and a chip, for implementing a mutually-exclusive operation of multiple threads, so as to solve a congestion phenomenon generated due to threads increasing and improve a speed of collaborative execution of the threads.

To achieve the foregoing objectives, the embodiments of the present invention use the following technical solutions.

According to a first aspect, a method for implementing a mutually-exclusive operation of multiple threads is provided, where the method includes receiving a lock message sent by a small core, where the lock message carries a memory address corresponding to a lock requested by a first thread in the small core; calculating, by using the memory address corresponding to the requested lock, a code number of a lock assembly to which the requested lock belongs. The method also includes sending the lock message to the lock assembly corresponding to the code number, to request the lock assembly to process the lock message.

In a first possible implementation manner, according to the first aspect, the calculating, by using the memory address corresponding to the requested lock, a code number of a lock assembly to which the requested lock belongs, includes calculating a remainder by dividing the memory address corresponding to the requested lock by a quantity of all lock assemblies, and using the remainder as the code number of the lock assembly to which the requested lock belongs.

In a second possible implementation manner, according to the first aspect or the first possible implementation manner, information about the requested lock includes the memory address corresponding to the lock, a state of the lock, a quantity of and code numbers of threads waiting for the lock, a code number of a thread currently using the lock, and information indicating a next thread to acquire the lock, where the state of the lock is an idle state or an occupied state. The sending the lock message to the lock assembly corresponding to the code number, to request the lock assembly to process the lock message, specifically includes sending the lock message to the lock assembly corresponding to the code number, to request, after the lock assembly finds the information about the requested lock according to the memory address corresponding to the requested lock that is carried in the lock message, the lock assembly to process the lock message according to the information about the requested lock, and also updating the information about the requested lock.

In a third possible implementation manner, according to the first aspect or the first possible implementation manner, information about the requested lock includes the memory address corresponding to the lock, a state of the lock, a quantity of threads waiting for the lock, a code number of a thread that is using the lock, a vector indicating states of all threads on a chip, and information indicating a next thread to acquire the lock, where the state of the thread includes whether the thread is waiting for the lock. The sending the lock message to the lock assembly corresponding to the code number, to request the lock assembly to process the lock message specifically includes sending the lock message to the lock assembly corresponding to the code number, to request, after the lock assembly finds the information about the requested lock according to the memory address corresponding to the requested lock that is carried in the lock message, the lock assembly to process the lock message according to the information about the requested lock, and also updating the information about the requested lock.

According to a second aspect, an apparatus for implementing a mutually-exclusive operation of multiple threads is provided, where the apparatus includes a receiving unit, a calculating unit, and a sending unit, where the receiving unit is configured to receive a lock message sent by a small core, where the lock message carries a memory address corresponding to a lock requested by a first thread in the small core, and the lock message is a lock application message or a lock release message. The calculating unit is configured to calculate, by using the memory address corresponding to the requested lock, a code number of a lock assembly to which the requested lock belongs. The sending unit is configured to send the lock message to the lock assembly corresponding to the code number, to request the lock assembly to process the lock message.

In a first possible implementation manner, according to the second aspect, that the calculating unit calculates, by using the memory address corresponding to the requested lock, a code number of a lock assembly to which the requested lock belongs includes calculating a remainder by dividing the memory address corresponding to the requested lock by a quantity of all lock assemblies, and using the remainder as the code number of the lock assembly to which the requested lock belongs.

In a second possible implementation manner, according to the second aspect or the first possible implementation manner, information about the requested lock includes the memory address corresponding to the lock, a state of the lock, a quantity of and code numbers of threads waiting for the lock, a code number of a thread that is using the lock, and information indicating a next thread to acquire the lock, where the state of the lock is an idle state or an occupied state; and that the sending unit sends the lock message to the lock assembly corresponding to the code number, to request the lock assembly to process the lock message specifically includes sending the lock message to the lock assembly corresponding to the code number, to request, after the lock assembly finds the information about the requested lock according to the memory address corresponding to the requested lock that is carried in the lock message, the lock assembly to process the lock message according to the information about the requested lock, and also updating the information about the requested lock.

In a third possible implementation manner, according to the second aspect or the first possible implementation manner, information about the requested lock includes the memory address corresponding to the lock, a state of the lock, a quantity of threads waiting for the lock, a code number of a thread that is using the lock, a vector indicating states of all threads on a chip, and information indicating a next thread to acquire the lock, where the state of the thread includes whether the thread is waiting for the lock; and that the sending unit sends the lock message to the lock assembly corresponding to the code number, to request the lock assembly to process the lock message specifically includes sending the lock message to the lock assembly corresponding to the code number, to request, after the lock assembly finds the information about the requested lock according to the memory address corresponding to the requested lock that is carried in the lock message, the lock assembly to process the lock message according to the information about the requested lock, and also updating the information about the requested lock.

According to a third aspect, a chip for implementing a mutually-exclusive operation of multiple threads is provided, where the chip includes: a small core, a routing component, and a lock assembly, where the routing component is configured to receive a lock message sent by the small core, where the lock message carries a memory address corresponding to a lock requested by a first thread in the small core, and the lock message is a lock application message or a lock release message; the routing component is further configured to calculate, by using the memory address corresponding to the requested lock, a code number of the lock assembly to which the requested lock belongs; the routing component is further configured to send the lock message to the lock assembly corresponding to the code number, to request the lock assembly to process the lock message; the lock assembly is configured to receive the lock message sent by the routing component; and the lock assembly is further configured to process the lock message.

In a first possible implementation manner, according to the third aspect, that the routing component calculates, by using the memory address corresponding to the requested lock, a code number of a lock assembly to which the requested lock belongs includes calculating a remainder by dividing the memory address corresponding to the requested lock by a quantity of all lock assemblies, and using the remainder as the code number of the lock assembly to which the requested lock belongs.

In a second possible implementation manner, according to the third aspect or the first possible implementation manner, information about the requested lock includes: the memory address corresponding to the lock, a state of the lock, a quantity of and code numbers of threads waiting for the lock, a code number of a thread that is using the lock, and information indicating a next thread to acquire the lock, where the state of the lock is an idle state or an occupied state; and that the routing component sends the lock message to the lock assembly corresponding to the code number, to request the lock assembly to process the lock message specifically includes: sending the lock message to the lock assembly corresponding to the code number, to request, after the lock assembly finds the information about the requested lock according to the memory address corresponding to the requested lock that is carried in the lock message, the lock assembly to process the lock message according to the information about the requested lock, and also updating the information about the requested lock.

In a third possible implementation manner, according to the second possible implementation manner, if the lock message is a lock application message, the lock message further carries a code number of the first thread; and that the lock assembly is further configured to process the lock message specifically includes searching for the information about the requested lock according to the memory address corresponding to the requested lock that is carried in the requested lock message; checking a state of the lock included in the information about the requested lock; if the state of the requested lock is an occupied state, determining whether a quantity of threads waiting for the requested lock is less than a maximum quantity of threads supported by the chip; if the quantity of threads waiting for the requested lock is less than the maximum quantity of threads supported by the chip, writing the code number of the first thread into a code number field of the threads waiting for the requested lock, and also updating the quantity of the threads waiting for the lock; and if the quantity of threads waiting for the requested lock is not less than the maximum quantity of threads supported by the chip, writing the code number of the first thread into memory of the requested lock.

In a fourth possible implementation manner, according to the third aspect or the first possible implementation manner, information about the requested lock includes: the memory address corresponding to the lock, a state of the lock, a quantity of threads waiting for the lock, a code number of a thread that is using the lock, a vector indicating states of all threads on a chip, and information indicating a next thread to acquire the lock, where the state of the thread includes whether the thread is waiting for the lock; and that the routing component sends the lock message to the lock assembly corresponding to the code number, to request the lock assembly to process the lock message specifically includes: sending the lock message to the lock assembly corresponding to the code number, to request, after the lock assembly finds the information about the requested lock according to the memory address corresponding to the requested lock that is carried in the lock message, the lock assembly to process the lock message according to the information about the requested lock, and also updating the information about the requested lock.

According to a fourth aspect, a computer node is provided, where the computer node includes the chip for implementing a mutually-exclusive operation of multiple threads according to any one of items of the third aspect.

According to a fifth aspect, a computer system is provided, where the computer system includes memory, and the computer node according to the fourth aspect.

The embodiments of the present invention provide a method, an apparatus, and a chip for implementing a mutually-exclusive operation of multiple threads, where the method includes receiving a lock message sent by a small core, where the lock message carries a memory address corresponding to a lock requested by a first thread in the small core. The method also includes calculating, by using the memory address corresponding to the requested lock, a code number of a lock assembly to which the requested lock belongs, and sending the lock message to the lock assembly corresponding to the code number, to request the lock assembly to process the lock message.

Based on the foregoing descriptions, multiple lock assemblies are distributed on a chip to separately manage a lock application message for applying for a lock and a lock release message for releasing a lock that are of different small cores, thereby solving a congestion phenomenon generated when a quantity of threads increases, reducing a wait time of the threads, and improving a speed of collaborative execution of the threads.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Embodiment 1

Figure 1:
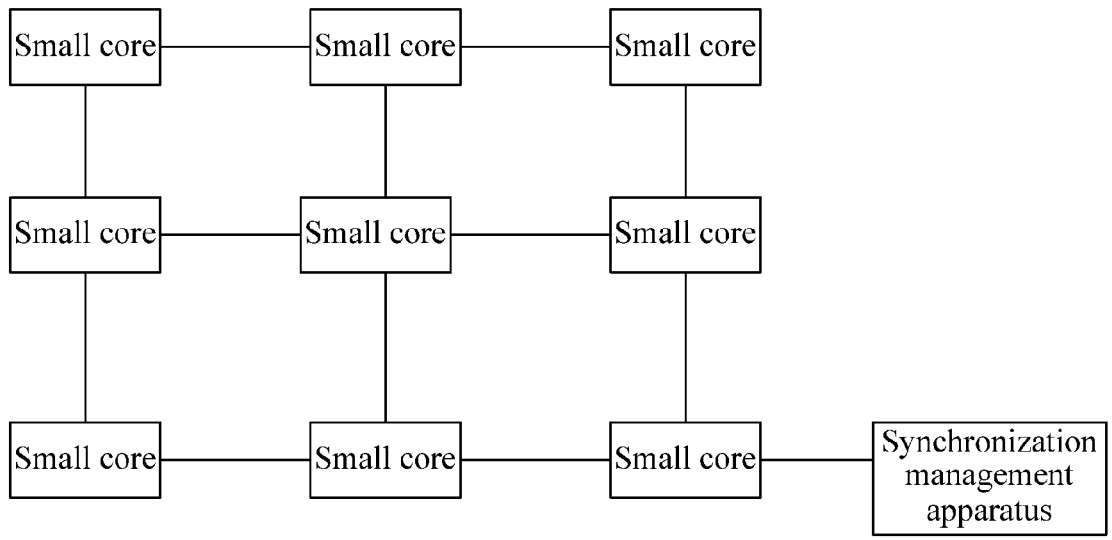
FIG. 1 is a schematic structural diagram of a chip for implementing a mutually-exclusive operation of multiple threads in the prior art.
Figure 2:
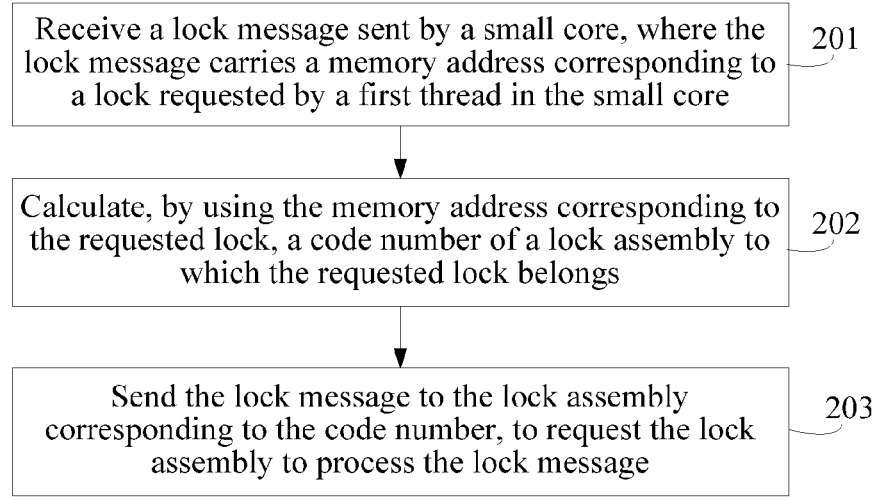
FIG. 2 is a method for implementing a mutually-exclusive operation of multiple threads according to an embodiment of the present invention.

This embodiment of the present invention provides a method for implementing a mutually-exclusive operation of multiple threads. The method is executed by a routing component on a chip, and specifically, as shown in FIG. 2, the method includes the following steps.

201: Receive a lock message sent by a small core, where the lock message carries a memory address corresponding to a lock requested by a first thread in the small core.

The lock message includes a lock application message and a lock release message.

Specifically, with development of semiconductor processes, a quantity of transistors that may be integrated on a chip is increasing, and to reduce power consumption and heat dissipation while improving performance, an architecture designer puts forward a thread-level coarse-grain parallel on-chip multi-core/many-core processor. The on-chip multi-core/many core processor refers to a multi-core/many-core processor integrated on a same chip, where more processor cores are integrated on the chip of the many-core processor than that of the multi-core processor. It is generally considered that a processor with a chip on which less than 8 small cores are integrated is referred to as a multi-core processor, and a processor with a chip on which more than 8 small cores are integrated is referred to as a many-core processor.

In small cores of the multi-core/many-core processor, when multiple threads are executed in parallel, a variable may be shared by the multiple threads. However, at a moment, only one thread is allowed to exclusively occupy shared memory, otherwise the accessed data may be disordered. In the prior art, to solve the problem, a concept of a lock is introduced, where the lock is a mechanism that ensures only one thread operation is protected at a moment in multiple threads, and information included in the lock identifies a state of shared memory to be accessed by the thread. Whether the shared memory is permitted to access is determined by using the state of the shared memory to be accessed, so that each thread accesses the shared memory in sequence.

In this embodiment of the present invention, the routing component receives the lock application message sent by the small core, where the lock application message carries the memory address corresponding to the lock requested by the first thread in the small core, finds the lock by using the memory address, and finally determines a state of the requested lock.

After finishing accessing the shared memory, the routing component receives a lock release message sent by the small core, where the lock release message also carries the memory address corresponding to the lock requested by the first thread in the small core, and releases space of the shared memory by executing the lock release message, so that other threads gain access to the shared memory.

202: Calculate, by using the memory address corresponding to the requested lock, a code number of a lock assembly to which the requested lock belongs.

Specifically, in this embodiment of the present invention, multiple lock assemblies are distributed on a chip, and each lock assembly includes a quantity of locks. When the quantity of threads increases, each lock assembly manages a lock application message for applying for a lock and a lock release message for releasing the lock that are of one small core, thereby solving a congestion phenomenon occurring in the prior art, meanwhile, reducing a wait time of the threads, and improving a speed of collaborative execution of the threads.

Correspondingly, because multiple lock assemblies exist, after receiving a lock message sent by the small core, the routing component first needs to calculate, by using the memory address corresponding to the requested lock, the code number of the lock assembly to which the requested lock belongs.

The calculating, by using the memory address corresponding to the requested lock, a code number of a lock assembly to which the requested lock belongs may specifically include calculating a remainder by dividing the memory address corresponding to the requested lock by a quantity of all lock assemblies, and using the remainder as the code number of the lock assembly to which the requested lock belongs.

For example, there are 4 lock assemblies whose code numbers are separately 0, 1, 2, and 3, where memory addresses corresponding to 5 locks in a lock assembly whose code number is 0 are separately 0000, 0004, 0008, 000C, and 0010; memory addresses corresponding to 5 locks in a lock assembly whose code number is 1 are separately 0001, 0005, 0009, 000D, and 0011; memory addresses corresponding to 5 locks in a lock assembly whose code number is 2 are separately 0002, 0006, 000A, 000E, and 0012; and memory addresses corresponding to 5 locks in a lock assembly whose code number is 3 are separately 0003, 0007, 000B, 000F, and 0013.

For example, if the memory address corresponding to the requested lock is 0009 and the quantity of lock assemblies is 4 the remainder can be calculated by the following formula.

$$remainder = rem(\text{the memory address}/\text{the quantity of lock assemblies}) = rem(9/4) = 1$$

In the above example, the remainder 1 is used as the code number of the lock assembly to which the requested lock belongs.

Alternatively, a correspondence between the code number of the lock assembly and the memory address corresponding to the requested lock may also be prestored in the routing component.

For example, if there are 3 lock assemblies 1, 2, and 3, the prestored correspondence is:

the lock assembly 1: a memory address field identified by a lock is 0000-003F;

the lock assembly 2: a memory address field identified by a lock is 0040-007F; and the lock assembly 3: a memory address field identified by a lock is 0080-00BF.

If the memory address corresponding to the requested lock is 0009, the code number of the lock assembly to which the requested lock belongs may be calculated by using the following method: querying a correspondence table to determine that 0009 falls in the address field 0000-003F, which corresponds to the lock assembly 1, so that the code number of the lock assembly to which the requested lock belongs is 1.

This embodiment of the present invention is intended to describe the calculating, by using the memory address corresponding to the requested lock, a code number of a lock assembly to which the requested lock belongs, and is not intent to specifically limit how to calculate the code number of the lock assembly to which the requested lock belongs.

203: Send the lock message to the lock assembly corresponding to the code number, to request the lock assembly to process the lock message.

Specifically, after calculating, by using the memory address corresponding to the requested lock, a code number of a lock assembly to which the requested lock belongs, the sending the lock message to the lock assembly corresponding to the code number to request the lock assembly to process the lock message may specifically include sending the lock message to the lock assembly corresponding to the code number, to request, after the lock component finds the information about the requested lock according to the memory address corresponding to the requested lock that is carried in the lock message, the lock assembly to process the lock message according to the information about the requested lock; and updating the information about the requested lock.

The information about the requested lock may include: the memory address corresponding to the lock, a state of the lock, a quantity and code numbers of threads waiting for the lock, a code number of a thread currently using the lock, and information indicating a next thread to acquire the lock, where the state of the lock is an idle state or an occupied state.

Alternatively, the information about the requested lock includes the memory address corresponding to the lock, a state of the lock, a quantity of threads waiting for the lock, a code number of a thread currently using the lock, a vector indicating states of all threads on a chip, and information indicating a next thread to acquire the lock, where the state of the thread includes the thread is waiting for the lock or the thread is not waiting for the lock.

This embodiment of the present invention does not specifically limit the information about the requested lock.

This embodiment of the present invention provides a method for implementing a mutually-exclusive operation of multiple threads, where the method includes receiving a lock message sent by a small core, where the lock message carries a memory address corresponding to a lock requested by a first thread in the small core; calculating, by using the memory address corresponding to the requested lock, a code number of a lock assembly to which the requested lock belongs; and sending the lock message to the lock assembly corresponding to the code number, to request the lock assembly to process the lock message.

Based on the descriptions of the foregoing embodiment, multiple lock assemblies are distributed on a chip to separately manage a lock application message for applying for a lock and a lock release message for releasing a lock that are of different small cores, thereby solving a congestion phenomenon generated when a quantity of threads increases, reducing a wait time of the threads, and improving a speed of collaborative execution of the threads.

Embodiment 2

Figure 3:
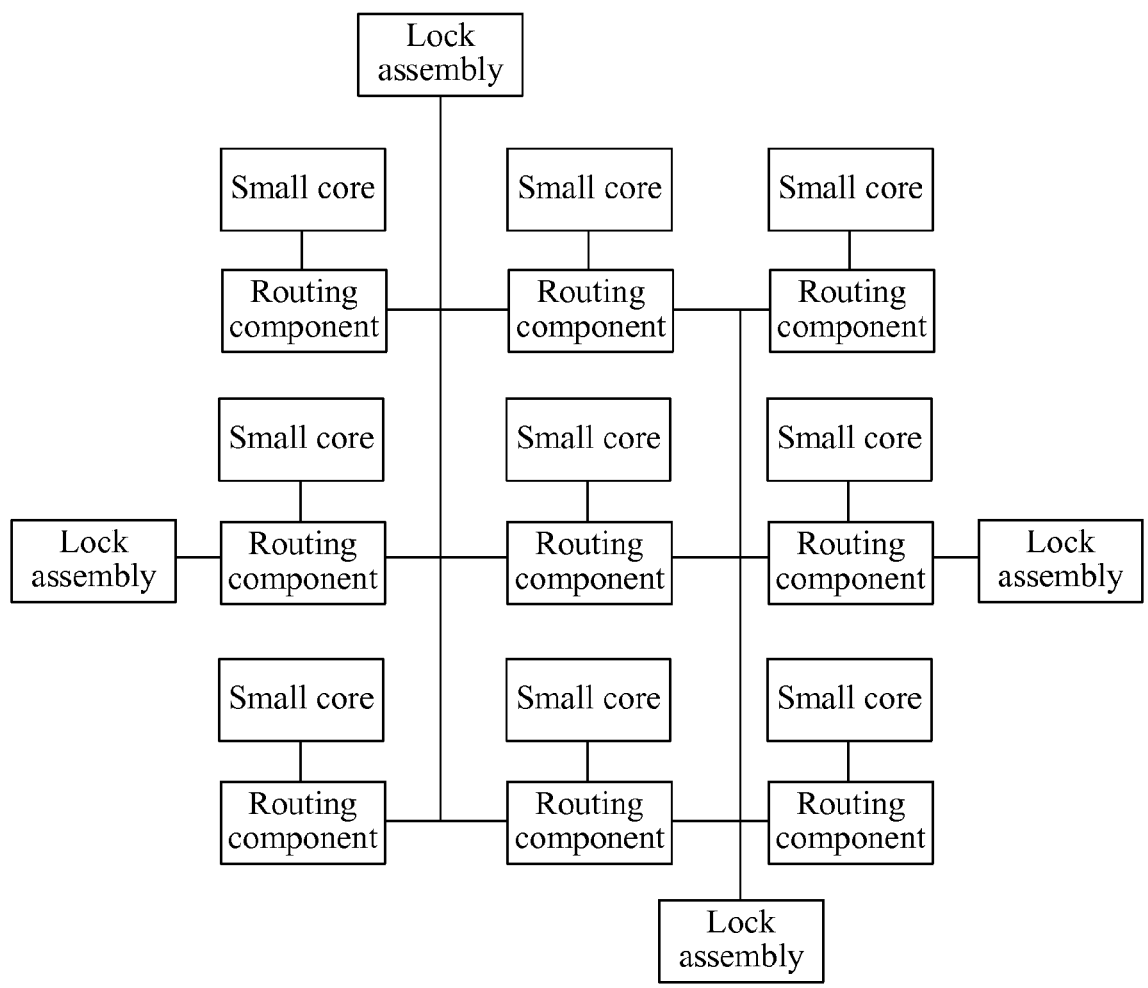
FIG. 3 is a schematic structural diagram of a chip for implementing a mutually-exclusive operation of multiple threads according to an embodiment of the present invention.

This embodiment of the present invention provides a method for implementing a mutually-exclusive operation of multiple threads. The method is described by taking a schematic structural diagram of a chip shown in FIG. 3 as an example. The chip includes small cores, routing components, and lock assemblies. Each small core is connected to a routing component, and the routing components are interconnected, so as to form an on-chip network Multiple lock assemblies are distributed around the small core, information included in multiple locks is stored in the lock assembly, and a routing component is directly connected to the lock assembly. In this way, the small core may interact with the lock assembly by using a routing component connected to the small core.

Figure 4:
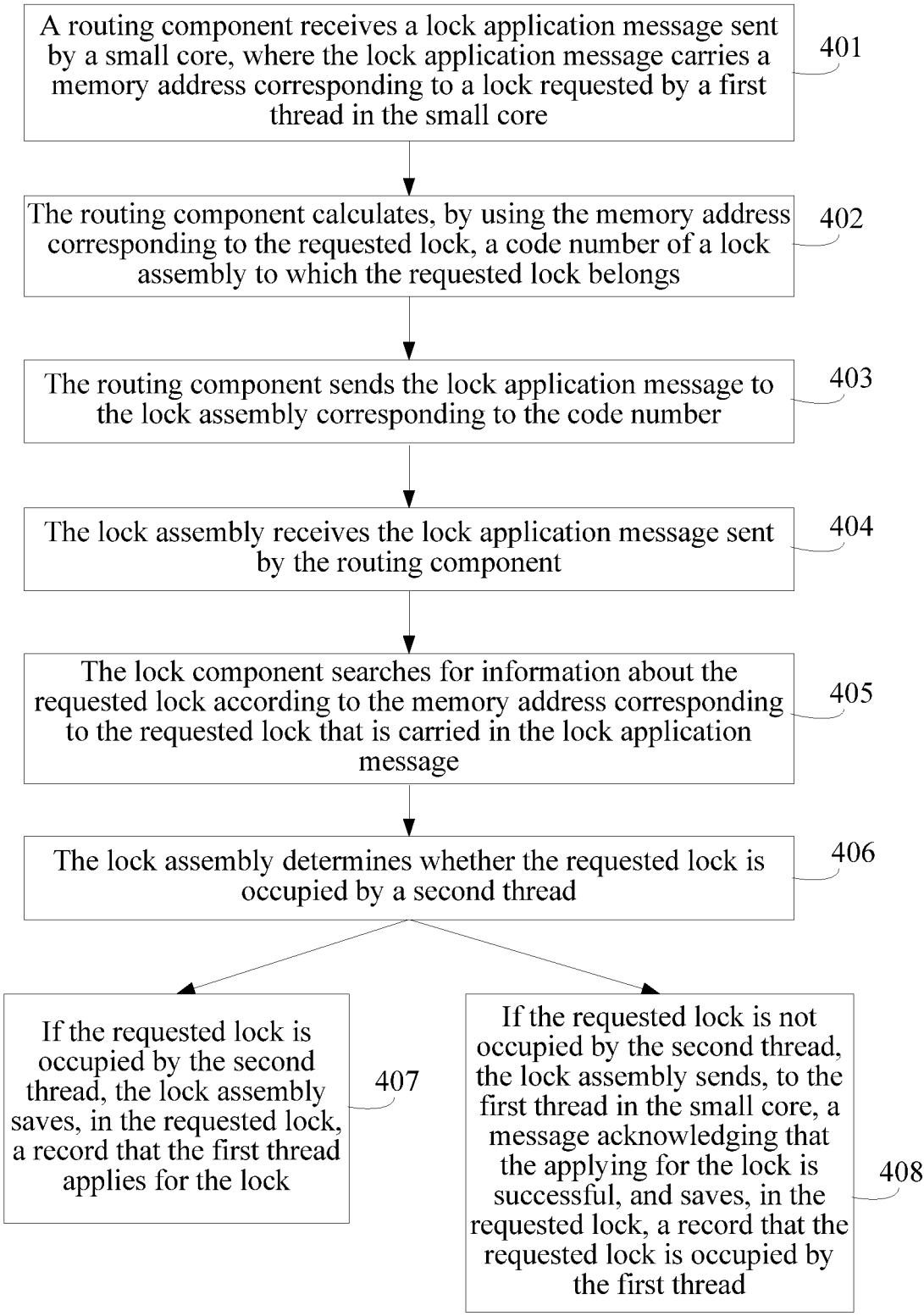
FIG. 4 shows another method for implementing a mutually-exclusive operation of multiple threads according to an embodiment of the present invention.

Specifically, that the small core sends a lock application message is taken as an example for description. As shown in FIG. 4, the method includes the following steps.

401: A routing component receives a lock application message sent by a small core, where the lock application message carries a memory address corresponding to a lock requested by a first thread in the small core.

Specifically, with development of semiconductor processes, a quantity of transistors that may be integrated on a chip is increasing, and to reduce power consumption and heat dissipation while improving performance, an architecture designer puts forward a thread-level coarse-grain parallel on-chip multi-core/many-core processor. The on-chip multi-core/many-core processor refers to a multi-core/many-core processor integrated on a same chip, where more processor cores are integrated on the chip of the many-core processor than that of the multi-core processor. It is generally considered that a processor with a chip on which less than 8 small cores are integrated is referred to as a multi-core processor, and a processor with a chip on which more than 8 small cores are integrated is referred to as a many-core processor.

In small cores of the multi-core/many-core processor, when multiple threads are executed in parallel, a variable may be shared by multiple threads. However, at a moment, only one thread is allowed to exclusively occupy shared memory; otherwise the data may be disordered. In the prior art, to solve the problem, a concept of a lock is introduced, where the lock is a mechanism that ensures only one thread is protected at a moment in multiple threads, and information included in the lock identifies a state of shared memory to be accessed by the thread. Whether the shared memory is permitted to be access is determined by using the state of the shared memory to be accessed, so that each thread accesses the shared memory in sequence.

Information about the requested lock may include: the memory address corresponding to the lock, a state of the lock, a quantity and code numbers of threads waiting for the lock, a code number of a thread currently using the lock, and information indicating a next thread to acquire the lock, where the state of the lock is an idle state or an occupied state.

Alternatively, information about the requested lock includes the memory address corresponding to the requested lock, a state of the requested lock, a quantity of threads waiting for the requested lock, a code number of a thread that is using the requested lock, a vector indicating states of all threads on a chip, and information indicating a next thread to acquire the requested lock, where the state of the thread includes the thread is waiting for the requested lock and the thread is not waiting for the requested lock.

This embodiment of the present invention does not specifically limit the information about the requested lock.

In this embodiment of the present invention, the routing component receives the lock application message sent by the small core, where the lock application message carries the memory address corresponding to the lock requested by the first thread in the small core, finds information about the lock by using the memory address, and finally determines a state of the requested lock.

402: The routing component calculates, by using the memory address corresponding to the requested lock, a code number of a lock assembly to which the requested lock belongs.

Specifically, in this embodiment of the present invention, multiple lock assemblies are distributed on a chip, and each lock assembly includes a quantity of locks, so that multiple locks may be dispersed in the multiple lock assemblies. When the quantity of threads increases, each lock assembly manages a lock application message for applying for a requested lock and a lock release message for releasing the requested lock that are of one small core, thereby solving a congestion phenomenon occurring in the prior art, while, reducing a wait time of the threads, and improving a speed of collaborative execution of the threads.

Correspondingly, because multiple lock assemblies exist, after receiving a lock message sent by the small core, the routing component first needs to calculate, by using the memory address corresponding to the requested lock, the code number of the lock assembly to which the requested lock belongs.

The calculating, by using the memory address corresponding to the requested lock, a code number of a lock assembly to which the requested lock belongs may specifically include calculating a remainder by dividing the memory address corresponding to the requested lock by a quantity of all lock assemblies, and using the remainder as the code number of the lock assembly to which the requested lock belongs.

For example, there are 4 lock assemblies whose code numbers are separately 0, 1, 2, and 3, where memory addresses corresponding to 5 locks in a lock assembly whose code number is 0 are separately 0000, 0004, 0008, 000C, and 0010; memory addresses corresponding to 5 locks in a lock assembly whose code number is 1 are separately 0001, 0005, 0009, 000D, and 0011; memory addresses corresponding to 5 locks in a lock assembly whose code number is 2 are separately 0002, 0006, 000A, 000E, and 0012; and memory addresses corresponding to 5 locks in a lock assembly whose code number is 3 are separately 0003, 0007, 000B, 000F, and 0013.

For example, if the memory address corresponding to the requested lock is 0009 and the quantity of lock assemblies is 4 the remainder can be first calculated by the following formula.

the remainder=rem(the memory address/the quantity of lock assemblies)=rem(9/4)=1

In the above example, the remainder 1 is used as the code number of the lock assembly to which the requested lock belongs.

Alternatively, a correspondence between the code number of the lock assembly and the memory address corresponding to the requested lock may also be prestored in the routing component.

For example, if there are 3 lock assemblies 1, 2, and 3, the prestored correspondence is:

the lock assembly 1: a memory address field identified by a lock is 0000-003F;
the lock assembly 2: a memory address field identified by a lock is 0040-007F; and
the lock assembly 3: a memory address field identified by a lock is 0080-00BF.

If the memory address corresponding to the requested lock is 0009, the code number of the lock assembly to which the requested lock belongs may be calculated by using the following method: querying a correspondence table to determine that 0009 falls in the address field 0000-003F which corresponds to the lock assembly 1, so that the code number of the lock assembly to which the requested lock belongs is 1.

This embodiment of the present invention is intended to describe the calculating, by using the memory address corresponding to the requested lock, a code number of a lock assembly to which the requested lock belongs, and is not intended to specifically limit how to calculate the code number of the lock assembly to which the requested lock belongs.

403: The routing component sends the lock application message to the lock assembly corresponding to the code number, to request the lock assembly to process the lock application message.

Specifically, after calculating, by using the memory address corresponding to the requested lock, a code number of a lock assembly to which the requested lock belongs, the sending the lock application message to the lock assembly corresponding to the code number, to request the lock assembly to process the lock application message may specifically include sending the lock message to the lock assembly corresponding to the code number, to request, after the lock component finds the information about the requested lock according to the memory address corresponding to the requested lock that is carried in the lock message, the lock assembly to process the lock message according to a state of the lock included in the information about the requested lock, and updating the information about the requested lock.

The information about the requested lock may include: the memory address corresponding to the lock, a state of the lock, a quantity and code numbers of threads waiting for the lock, a code number of a thread currently using the lock, and information indicating a next thread to acquire the lock, where the state of the lock is an idle state or an occupied state.

Alternatively, the information about the requested lock includes: the memory address corresponding to the requested lock, a state of the requested lock, a quantity of threads waiting for the requested lock, a code number of a thread that is using the requested lock, a vector indicating states of all threads on a chip, and information indicating a next thread to acquire the requested lock, where the state of the thread includes the thread is waiting for the requested lock or the thread is not waiting for the lock.

This embodiment of the present invention does not specifically limit the information about the requested lock.

404: The lock assembly receives the lock application message sent by the routing component.

After the lock assembly receives the lock application message sent by the routing component, the lock assembly starts to perform the operation of processing the lock application message, that is, steps 405 to 408.

405: The lock assembly searches for information about the requested lock according to the memory address corresponding to the requested lock that is carried in the lock application message.

406: The lock assembly determines, according to a state of the lock included in the information about the requested lock, whether the requested lock is occupied by a second thread.

Specifically, an internal structure of a lock, as shown in Table 1, may include:

Address: a unique identifier of a lock, that is, a memory address;
State: a state of the lock, including an idle state and an occupied state;
Counter: a quantity of threads waiting for the lock;
User: a code number of a thread currently using the lock;
Waiter1, Waiter2, . . . , and WaiterN: code numbers of threads waiting for the lock, where N is a maximum quantity of threads supported by a chip; and
Pointer: information indicating a next thread to acquire the lock.

TABLE 1

| Address | State | Counter | User | Waiter1 | Waiter2 | . . . | WaiterN | Pointer |
|---|---|---|---|---|---|---|---|---|

The State field representing the state of the lock indicates whether the lock is occupied by a second thread.

If the lock is in the occupied state, it indicates that the lock is occupied by the second thread, and perform step 407.

If the lock is in the idle state, it indicates that the lock is not occupied by the second thread, and perform step 408.

An internal structure of a lock, as shown in Table 2, may include:

Address: a unique identifier of a lock, that is, a memory address;
State: a state of the lock, including an idle state and an occupied state;
Counter: a quantity of threads waiting for the lock;
User: a code number of a thread that is using the lock;
Waiter Bit Mask: a vector indicating states of all threads on a chip, where each bit may be used to represent a thread, for example, the first bit represents a thread 1, the second bit represents a thread 2, . . . , where the value of one of the bits may be set as follows: "1" represents that the thread is waiting for the lock, and "0" represents that the thread is no longer waiting for the lock, so that storage space may be reduced; and Pointer: information indicating a next thread to acquire the lock.

TABLE 2

| Address | State | Counter | User | Waiter Bit Mask | Pointer |
|---------|-------|---------|------|-----------------|---------|

Likewise, the State field representing the state of the lock indicates whether the lock is occupied by a second thread.

If the lock is in the occupied state, it indicates that the lock is occupied by the second thread; and if the lock is in the idle state, it indicates that the lock is not occupied by the second thread.

The lock assembly processes the lock application message according to the state of the requested lock, instead of completing a mutually-exclusive operation by setting a flag bit and constantly polling the flag bit. Therefore, this embodiment of the present invention can avoid a problem of a great network pressure caused by constantly polling the flag bit. Further, because the state of the lock is a part of information included in the lock, while the lock is a part of the lock assembly on the chip, all operations of the method are executed on the chip, thereby avoiding a problem of larger system overheads generated by accessing a flag bit outside the chip.

407: If the requested lock is occupied by the second thread, the lock assembly saves, in the requested lock, a record that the first thread applies for the lock.

Specifically, if the lock is in the occupied state, it indicates that the lock is occupied by the second thread, and for the internal structure of the lock shown in Table 1, in this case, the code number of the first thread should be written into the Waiter field. However, considering that the maximum quantity of threads supported by the chip is N, it should be first determined whether a quantity of threads of the request is less than the maximum quantity of threads supported by the chip, and if Counter<N, the code number of the first thread is written into the code number field of the thread waiting for the requested lock, that is, the Waiter field, and also the value of Counter should be increased by 1; and if Counter≥N, the code number of the first thread is written into memory identified by the requested lock.

For the internal structure of the lock shown in Table 2, in the vector indicating states of all threads on the chip, the state of the first thread should be set to a wait state, and the value of Counter should be increased by 1.

408: If the requested lock is not occupied by the second thread, the lock assembly sends, to the first thread in the small core, a message acknowledging that the applying for the lock is successful, and saves, in the requested lock, a record that the requested lock is occupied by the first thread.

Specifically, if the lock is in the idle state which indicates that the requested lock is not occupied by the second thread, the lock assembly sends, to the first thread in the small core, the message acknowledging that the applying for the lock is successful, so that the first thread accesses shared memory to execute corresponding code, and further saves, in the requested lock, the record that the requested lock is occupied by the first thread. For example, for the internal structure of the lock shown in Table 1, in this case, the state of the lock should be updated to the occupied state, and also the code number of the first thread is written into the code number field of the thread currently using the lock; and for the internal structure of the lock shown in Table 2, in this case, the state of the lock should be updated to the occupied state, the code number of the first thread should also be written into the code number field of the thread currently using the lock, and further in the vector indicating states of all threads on the chip, the state of the first thread is updated to not waiting for the lock.

Figure 5:
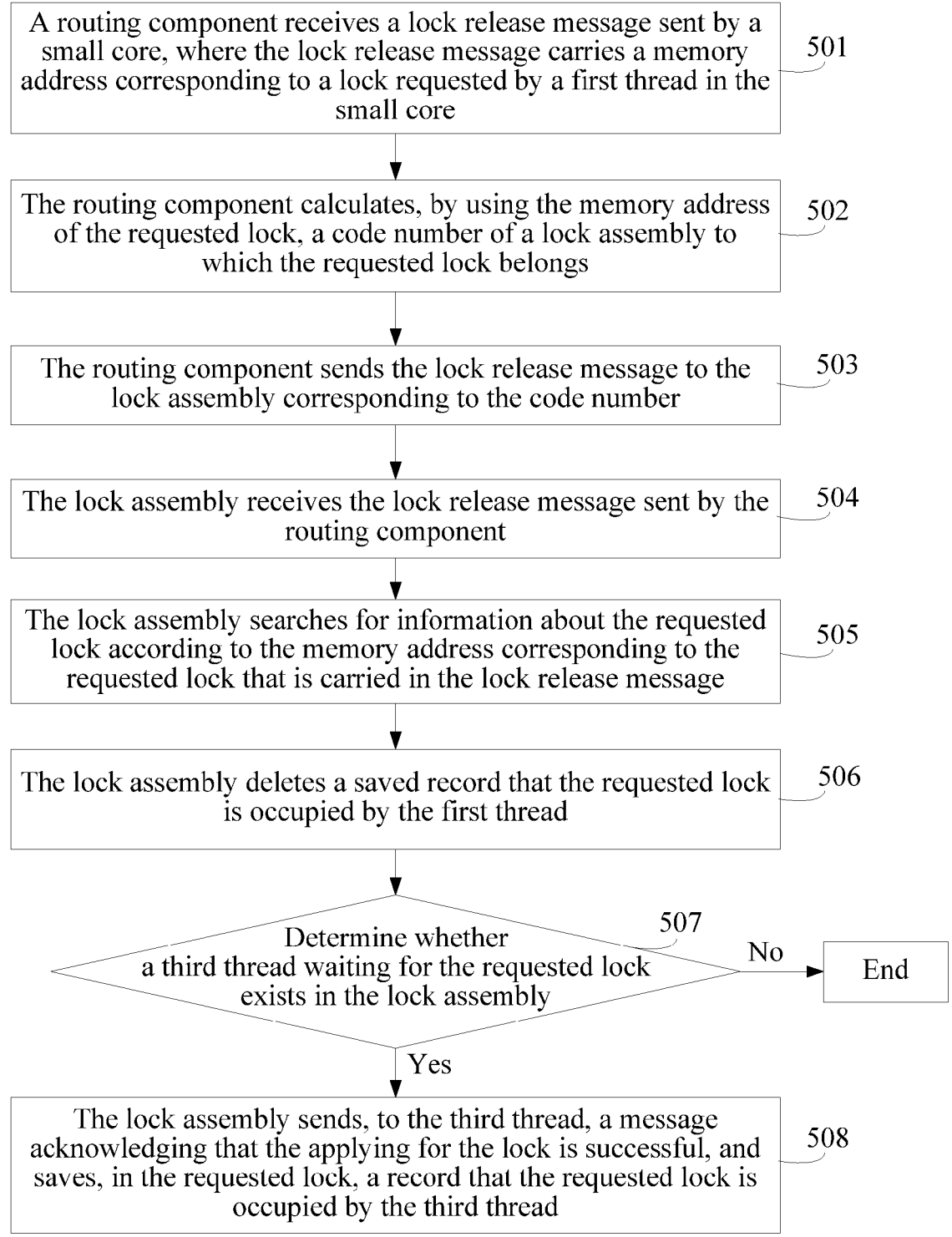
FIG. 5 shows still another method for implementing a mutually-exclusive operation of multiple threads according to an embodiment of the present invention.

Specifically, if the lock message sent by the small core is a lock release message, as shown in FIG. 5, the method includes the following steps.

501: A routing component receives a lock release message sent by a small core, where the lock release message carries a memory address corresponding to a lock requested by a first thread in the small core.

Specifically, after the first thread acquires the lock requested by the first thread to access shared memory, and executes the corresponding code completely, the routing component further receives a lock release message sent by the small core, where the lock release message also carries the memory address corresponding to the lock requested by the first thread in the small core, and releases space of the shared memory by executing the lock release message, so that other threads gain access to the shared memory.

502: The routing component calculates, by using the memory address corresponding to the requested lock, a code number of a lock assembly to which the requested lock belongs.

Specifically, for the method for calculating a code number of the lock assembly to which the requested lock belongs by using the memory address of the requested lock, reference may be made to the description of step 402, which is not repeated in this embodiment of the present invention.

503: The routing component sends the lock release message to the lock assembly corresponding to the code number, to request the lock assembly to process the lock release message.

504: The lock assembly receives the lock release message sent by the routing component.

After the lock assembly receives the lock release message sent by the routing component, the lock assembly starts to perform the operation of processing the lock release message, that is, steps 505 to 508.

505: The lock assembly searches for information about the requested lock according to the memory address corresponding to the requested lock that is carried in the lock release message.

506: The lock assembly deletes a saved record that the requested lock is occupied by the first thread.

Specifically, when the requested lock is stored in the lock assembly in a form of a queue shown in Table 1, after the lock assembly receives the lock release message sent by the routing component, the state of the lock should be updated to the idle state, and the code number field, in the queue, of the thread currently using the lock should be cleared.

When the requested lock is stored in the lock assembly in a form shown in Table 2, after the lock assembly receives the lock release message sent by the routing component, the state of the lock should be updated to the idle state, also the code number field, in a queue, of the thread that is using the lock should be cleared, and further in the vector indicating states of all threads on the chip, the state of the first thread is updated to not waiting for the lock.

507: The lock assembly determines, according to the quantity of threads waiting for the lock included in the information about the requested lock, whether a third thread waiting for the requested lock exists in the lock assembly.

Specifically, when the requested lock is stored in the lock assembly in a form shown in Table 1, whether the third thread waiting for the requested lock exists may be determined according to the Counter representing the quantity of threads waiting for the lock. If Counter>0, it indicates that the third thread waiting for the requested lock exists, and if Counter=0, it indicates that the third thread waiting for the requested lock does not exist.

Likewise, when the requested lock is stored in the lock assembly in a form shown in Table 2, whether the third thread waiting for the requested lock exists may also be determined according to the Count representing the quantity of threads waiting for the lock, which is not repeated herein.

508: If the third thread waiting for the requested lock exists, the lock assembly sends, to the third thread, a message acknowledging that the applying for the lock is successful, and saves, in the requested lock, a record that the requested lock is occupied by the third thread.

Specifically, when the requested lock is stored in the lock assembly in a form shown in Table 1, if the third thread waiting for the requested lock exists, the code number of the third thread may be determined according to information indicating a next thread to acquire the lock, and then the lock assembly sends, to the third thread, the message acknowledging that the applying for the lock is successful, so that the third thread accesses shared memory to execute corresponding code, and also further saves, in the requested lock, the record that the requested lock is occupied by the third thread. That is, in this case, the state of the lock should be updated to the occupied state, and also the code number of the third thread is written into the code number field of the thread currently using the lock, and the quantity of threads waiting for the lock is decreased by 1.

When the requested lock is stored in the lock assembly in a form shown in Table 2, a bit of the vector at which the third thread is may be determined according to the information indicating a next thread to acquire the lock, and then the lock assembly sends, to the third thread, the message acknowledging that the applying for the lock is successful, so that the third thread accesses shared memory to execute corresponding code, and further saves, in the requested lock, the record that the requested lock is occupied by the third thread. That is, in this case, the state of the lock should be updated to the occupied state, and further in the vector indicating states of all threads on the chip, the state of the third thread is updated to not waiting for the lock, and the quantity of threads waiting for the lock is decreased by 1.

This embodiment of the present invention provides a method for implementing a mutually-exclusive operation of multiple threads, where the method includes receiving a lock message sent by a small core, where the lock message carries a memory address corresponding to a lock requested by a first thread in the small core; calculating, by using the memory address corresponding to the requested lock, a code number of a lock assembly to which the requested lock belongs; and sending the lock message to the lock assembly corresponding to the code number, to request the lock assembly to process the lock message.

Based on the descriptions of the foregoing embodiment, multiple lock assemblies are distributed on a chip to separately manage a lock application message for applying for a lock and a lock release message for releasing a lock that are of different small cores, thereby solving a congestion phenomenon generated when a quantity of threads increases, reducing a wait time of the threads, and improving a speed of collaborative execution of the threads.

Embodiment 3

Figure 6:
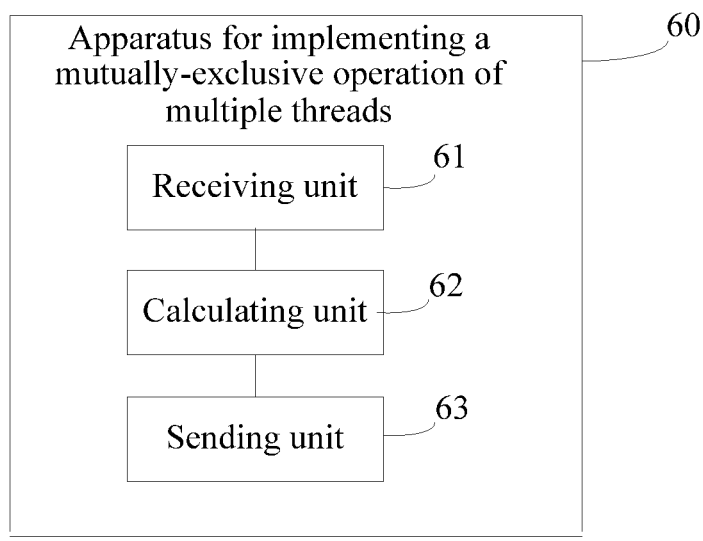
FIG. 6 shows an apparatus for implementing a mutually-exclusive operation of multiple threads according to an embodiment of the present invention.

This embodiment of the present invention provides an apparatus 60 for implementing a mutually-exclusive operation of multiple threads. Specifically, as shown in FIG. 6, the apparatus 60 includes a receiving unit 61, a calculating unit 62, and a sending unit 63.

The receiving unit 61 is configured to receive a lock message sent by a small core, where the lock message carries a memory address corresponding to a lock requested by a first thread in the small core, and the lock message is a lock application message or a lock release message.

Specifically, with development of semiconductor processes, a quantity of transistors that may be integrated on a chip is increasing, and to reduce power consumption and heat dissipation while improving performance, an architecture designer puts forward a thread-level coarse-grain parallel on-chip multi-core/many-core processor. The on-chip multi-core/many-core processor refers to a multi-core/many-core processor integrated on a same chip, where more processor cores are integrated on the chip of the many-core processor than that of the multi-core processor. It is generally considered that a processor with a chip on which less than 8 small cores are integrated is referred to as a multi-core processor, and a processor with a chip on which more than 8 small cores are integrated is referred to as a many-core processor.

In small cores of the multi-core/many-core processor, when multiple threads are executed in parallel, a variable may be shared by the multiple threads. However, at a moment, only one thread is allowed to exclusively occupy shared memory; otherwise data may be disordered. In the prior art, to solve the problem, a concept of a lock is introduced, where the lock is a mechanism that ensures only one thread operation is protected at a moment in multiple threads, and information included in the lock identifies a state of shared memory to be accessed by the thread. Whether the shared memory is permitted to be accessed is determined by using the state of the shared memory to be accessed, so that each thread accesses the shared memory in sequence.

The information about the requested lock may include the memory address corresponding to the requested lock, a state of the requested lock, a quantity of and code numbers of threads waiting for the requested lock, a code number of a thread currently using the requested lock, and information indicating a next thread to acquire the requested lock, where the state of the requested lock is an idle state or an occupied state.

Alternatively, information about the requested lock includes the memory address corresponding to the requested lock, a state of the requested lock, a quantity of threads waiting for the requested lock, a code number of a thread that is using the requested lock, a vector indicating states of all threads on a chip, and information indicating a next thread to acquire the requested lock, where the state of the thread includes the thread is waiting for the requested lock or the thread is not waiting for the requested lock.

This embodiment of the present invention does not specifically limit the information about the requested lock.

In this embodiment of the present invention, the receiving unit 61 receives the lock application message, which carries the memory address corresponding to the lock requested by the first thread in the small core, sent by the small core, finds the lock by using the memory address, and finally determines a state of the requested lock.

After finishing accessing the shared memory, the receiving unit 61 receives a lock release message, which also carries the memory address corresponding to the lock requested by the first thread in the small core, sent by the small core, and releases space of the shared memory by executing the lock release message, so that other threads gain access to the shared memory.

The calculating unit 62 is configured to calculate, by using the memory address corresponding to the requested lock, a code number of a lock assembly to which the requested lock belongs.

Specifically, in this embodiment of the present invention, multiple lock assemblies are distributed on a chip, and each lock assembly includes a quantity of locks, so that multiple locks may be dispersed in the multiple lock assemblies. When the quantity of threads increases, each lock assembly manage a lock application message for applying for a requested lock and a requested lock release message for releasing the requested lock that are of each small core, thereby solving a congestion phenomenon occurring in the prior art, while, reducing a wait time of the threads, and improving a speed of collaborative execution of the threads.

Correspondingly, because multiple lock assemblies exist, after receiving a lock message sent by the small core, the routing component first needs to calculate, by using the memory address corresponding to the requested lock, the code number of the lock assembly to which the requested lock belongs.

The calculating, by using the memory address corresponding to the requested lock, a code number of a lock assembly to which the requested lock belongs may specifically include: calculating a remainder by dividing the memory address corresponding to the requested lock by a quantity of all lock assemblies, and using the remainder as the code number of the lock assembly to which the requested lock belongs.

For example, there are 4 lock assemblies whose code numbers are separately 0, 1, 2, and 3, where memory addresses corresponding to 5 locks in a lock assembly whose code number is 0 are separately 0000, 0004, 0008, 000C, and 0010; memory addresses corresponding to 5 locks in a lock assembly whose code number is 1 are separately 0001, 0005, 0009, 000D, and 0011; memory addresses corresponding to 5 locks in a lock assembly whose code number is 2 are separately 0002, 0006, 000A, 000E, and 0012; and memory addresses corresponding to 5 locks in a lock assembly whose code number is 3 are separately 0003, 0007, 000B, 000F, and 0013.

For example, if the memory address corresponding to the requested lock is 0009 and:

The quantity of lock assemblies is 4, the remainder can be first calculated by the following formula.

the remainder=rem(the memory address/the quantity of lock assemblies)=rem(9/4)=1

In the above example, the remainder 1 is used as the code number of the lock assembly to which the requested lock belongs.

Alternatively, a correspondence between the code number of the lock assembly and the memory address corresponding to the requested lock may also be prestored in the routing component.

For example, if there are 3 lock assemblies 1, 2, and 3, the prestored correspondence is:

the lock assembly 1: a memory address field identified by a lock is 0000-003F;

the lock assembly 2: a memory address field identified by a lock is 0040-007F; and the lock assembly 3: a memory address field identified by a lock is 0080-00BF.

If the memory address corresponding to the requested lock is 0009, the code number of the lock assembly to which the requested lock belongs may be calculated by using the following method: querying a correspondence table to determine that 0009 falls in the address field 0000-003F which corresponds to the lock assembly 1, so that the code number of the lock assembly to which the requested lock belongs is 1.

This embodiment of the present invention is intended to describe the calculating, by using the memory address corresponding to the requested lock, a code number of a lock assembly to which the requested lock belongs, and is not intended to specifically limit how to calculate the code number of the lock assembly to which the requested lock belongs.

The sending unit 63 is configured to send the lock message to the lock assembly corresponding to the code number, to request the lock assembly to process the lock message.

Specifically, after the calculating, by using the memory address corresponding to the requested lock, a code number of a lock assembly to which the requested lock belongs, the sending the lock message to the lock assembly corresponding to the code number, to request the lock assembly to process the lock message may specifically include: sending the lock message to the lock assembly corresponding to the code number, to request, after the lock component finds the information about the requested lock according to the memory address corresponding to the requested lock that is carried in the lock message, the lock assembly to process the lock message according to the information about the requested lock, and updating the information about the requested lock.

Further, that the calculating unit 62 calculates, by using the memory address corresponding to the requested lock, a code number of a lock assembly to which the requested lock belongs specifically includes: calculating a remainder by dividing the memory address corresponding to the requested lock by a quantity of all lock assemblies, and using the remainder as the code number of the lock assembly to which the requested lock belongs.

Specifically, for the method for the calculating unit 62 to calculate a remainder by dividing the memory address corresponding to the requested lock by a quantity of all the lock assemblies, and use the remainder as the code number of the lock assembly to which the requested lock belongs, reference may be made to the description of step 202 in Embodiment 2, which is not repeated in this embodiment of the present invention.

Further, information about the requested lock includes: the memory address corresponding to the lock, a state of the lock, a quantity of and code numbers of threads waiting for the lock, a code number of a thread currently using the lock, and information indicating a next thread to acquire the lock, where the state of the lock is an idle state or an occupied state.

That the sending unit 63 sends the lock message to the lock assembly corresponding to the code number, to request the lock assembly to process the lock message specifically includes: sending the lock message to the lock assembly corresponding to the code number, to request, after the lock component finds the information about the requested lock according to the memory address corresponding to the requested lock that is carried in the lock message, the lock assembly to process the lock message according to the information about the requested lock, and updating the information about the requested lock.

Specifically, for an internal structure of the requested lock, reference may be made to the description of Table 1 in Embodiment 2, which is not repeated in this embodiment of the present invention.

It should be noted that, the lock assembly processes the lock application message according to the state of the requested lock, instead of completing a mutually-exclusive operation by setting a flag bit and constantly polling the flag bit. Therefore, this embodiment of the present invention can avoid a problem of a great network pressure caused by constantly polling the flag bit, and the state of the lock is a part of information included in the lock, while the lock is a part of the lock assembly on the chip. Therefore, all operations of the method are executed on the chip, thereby avoiding a problem of relatively large system overheads generated by accessing a flag bit outside the chip.

Optionally, information about the requested lock includes: the memory address corresponding to the requested lock, a state of the requested lock, a quantity of threads waiting for the requested lock, a code number of a thread that is using the requested lock, a vector indicating states of all threads on a chip, and information indicating a next thread to acquire the requested lock, where the state of the thread includes the thread is waiting for the requested lock or the thread is not waiting for the requested lock.

That the sending unit 63 sends the lock message to the lock assembly corresponding to the code number, to request the lock assembly to process the lock message specifically includes: sending the lock message to the lock assembly corresponding to the code number, to request, after the lock assembly finds the information about the requested lock according to the memory address corresponding to the requested lock that is carried in the lock message, the lock assembly to process the lock message according to the information about the requested lock, and also updating the information about the requested lock.

Specifically, for an internal structure of the requested lock, reference may be made to the description of Table 2 in Embodiment 2, which is not described again in this embodiment of the present invention.

Likewise, the lock assembly processes the lock application message according to the state of the requested lock, instead of completing a mutually-exclusive operation by setting a flag bit and constantly polling the flag bit. Therefore, this embodiment of the present invention can avoid a problem of a great network pressure caused by constantly polling the flag bit, and the state of the lock is a part of information included in the lock, while the lock is a part of the lock assembly on the chip. Therefore, all operations of the method are executed on the chip, thereby avoiding a problem of relatively large system overheads generated by accessing a flag bit outside the chip.

This embodiment of the present invention provides an apparatus for implementing a mutually-exclusive operation of multiple threads, where the apparatus includes: a receiving unit, a calculating unit, and a sending unit. The receiving unit receives a lock message sent by a small core, where the lock message carries a memory address corresponding to a lock requested by a first thread in the small core; the calculating unit calculates, by using the memory address corresponding to the requested lock, a code number of a lock assembly to which the requested lock belongs; and the sending unit sends the lock message to the lock assembly corresponding to the code number, to request the lock assembly to process the lock message.

Based on the descriptions of the foregoing embodiment, multiple lock assemblies are distributed on a chip to separately manage a lock application message for applying for a lock and a lock release message for releasing a lock that are of different small cores, thereby solving a congestion phenomenon generated when a quantity of threads increases, reducing a wait time of the threads, and improving a speed of collaborative execution of the threads with reference to the apparatus for implementing a mutually-exclusive operation of multiple threads.

Embodiment 4

Figure 7:
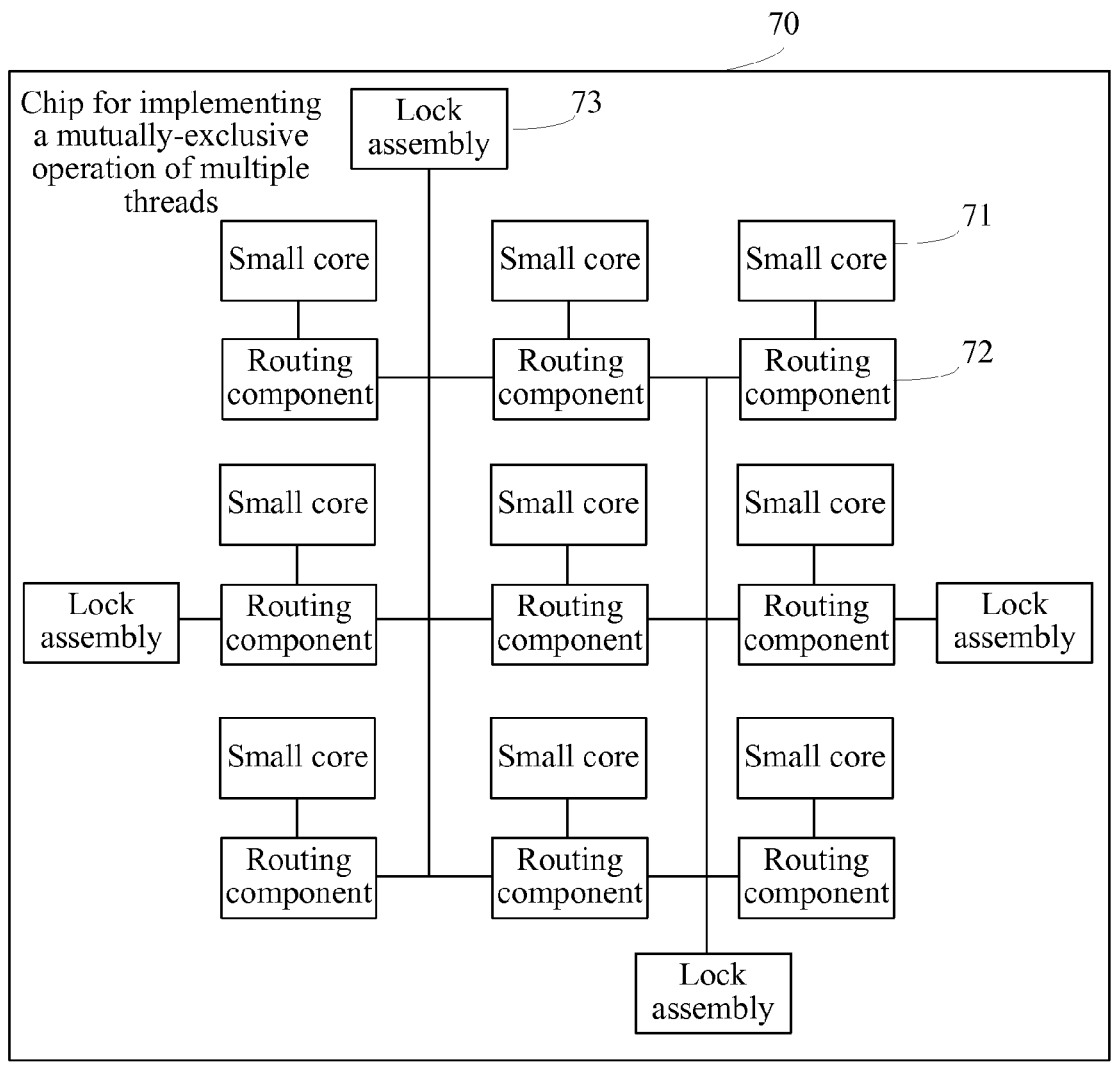
FIG. 7 shows a chip for implementing a mutually-exclusive operation of multiple threads according to an embodiment of the present invention.

This embodiment of the present invention provides a chip 70 for implementing a mutually-exclusive operation of multiple threads. Specifically, as shown in FIG. 7, the chip 70 includes a small core 71, a routing component 72, and a lock assembly 73.

The routing component 72 is configured to receive a lock message sent by the small core 71, where the lock message carries a memory address corresponding to a lock requested by a first thread in the small core 71, and the lock message is a lock application message or a lock release message.

The routing component 72 is further configured to calculate, by using the memory address corresponding to the requested lock, a code number of the lock assembly 73 to which the requested lock belongs.

The routing component 72 is further configured to send the lock message to the lock assembly 73 corresponding to the code number.

The lock assembly 73 is configured to receive the lock message sent by the routing component 72.

The lock assembly 73 is further configured to process the lock message.

Specifically, for the method for the lock assembly 73 to process the lock message, reference may be made to the description in Embodiment 2, which is not repeated in this embodiment of the present invention.

Further, that the routing component 72 calculates, by using the memory address corresponding to the requested lock, a code number of the lock assembly 73 to which the requested lock belongs specifically includes: calculating a remainder by dividing the memory address corresponding to the requested lock by a quantity of all lock assemblies, and using the remainder as the code number of the lock assembly to which the requested lock belongs.

Further, information about the requested lock includes: the memory address corresponding to the lock, a state of the lock, a quantity of and code numbers of threads waiting for the lock, a code number of a thread currently using the lock, and information indicating a next thread to acquire the lock, where the state of the lock is an idle state or an occupied state.

That the routing component 72 sends the lock message to the lock assembly corresponding to the code number, to request the lock assembly to process the lock message specifically includes: sending the lock message to the lock assembly corresponding to the code number, to request, after the lock component finds the information about the requested lock according to the memory address corresponding to the requested lock that is carried in the lock message, the lock assembly to process the lock message according to the information about the requested lock, and updating the information about the requested lock.

Specifically, for an internal structure of the requested lock, reference may be made to the description of Table 1 in Embodiment 2, which is not repeated in this embodiment of the present invention.

Further, if the lock message is a lock application message, the lock message further carries a code number of the first thread.

That the lock assembly 73 is further configured to process the lock message specifically includes: searching for the information about the requested lock according to the memory address corresponding to the requested lock that is carried in the requested lock message; checking a state of the lock included in the information about the requested lock; if the state of the requested lock is an occupied state, determining whether a quantity of threads waiting for the requested lock is less than a maximum quantity of threads supported by the chip; if the quantity of threads waiting for the requested lock is less than the maximum quantity of threads supported by the chip, writing the code number of the first thread into a code number field of the threads waiting for the requested lock, and also updating the quantity of the threads waiting for the lock; and if the quantity of threads waiting for the requested lock is not less than the maximum quantity of threads supported by the chip, writing the code number of the first thread into memory of the requested lock.

Optionally, information about the requested lock includes: the memory address corresponding to the lock, a state of the lock, a quantity of threads waiting for the lock, a code number of a thread that is using the lock, a vector indicating states of all threads on a chip, and information indicating a next thread to acquire the lock, where the state of the thread includes whether the thread is waiting for the lock.

That the routing component 73 sends the lock message to the lock assembly corresponding to the code number, to request the lock assembly to process the lock message specifically includes: sending the lock message to the lock assembly corresponding to the code number, to request, after the lock assembly finds the information about the requested lock according to the memory address corresponding to the requested lock that is carried in the lock message, the lock assembly to process the lock message according to the information about the requested lock, and also updating the information about the requested lock.

Specifically, for an internal structure of the requested lock, reference may be made to the description of Table 2 in Embodiment 2, which is not repeated in this embodiment of the present invention.

Specifically, for the method for the chip 70 to implement a mutually-exclusive operation of multiple threads, reference may be made to the description in Embodiment 2, which is not repeated in this embodiment of the present invention.

This embodiment of the present invention provides a chip for implementing a mutually-exclusive operation of multiple threads, where the chip includes: a small core, a routing component, and a lock assembly. First, the routing component receives a lock message sent by a small core, where the lock message carries a memory address corresponding to a lock requested by a first thread in the small core; next, the routing component calculates, by using the memory address of the requested lock, a code number of a lock assembly to which the requested lock belongs; and then, the routing component sends the lock message to the lock assembly corresponding to the code number, to request the lock assembly to process the lock message.

Based on the descriptions of the foregoing embodiment, the chip can independently complete the method for a mutually-exclusive operation of multiple threads, and therefore, the problem of relatively great system overheads generated by accessing a flag bit outside the chip can be avoided; and also multiple lock assemblies are distributed on the chip to separately manage a lock application message for applying for a lock and a lock release message for releasing a lock that are of different small cores, thereby solving a congestion phenomenon generated when a quantity of threads increases, reducing a wait time of the threads, and improving a speed of collaborative execution of the threads.

Embodiment 5

Figure 8:
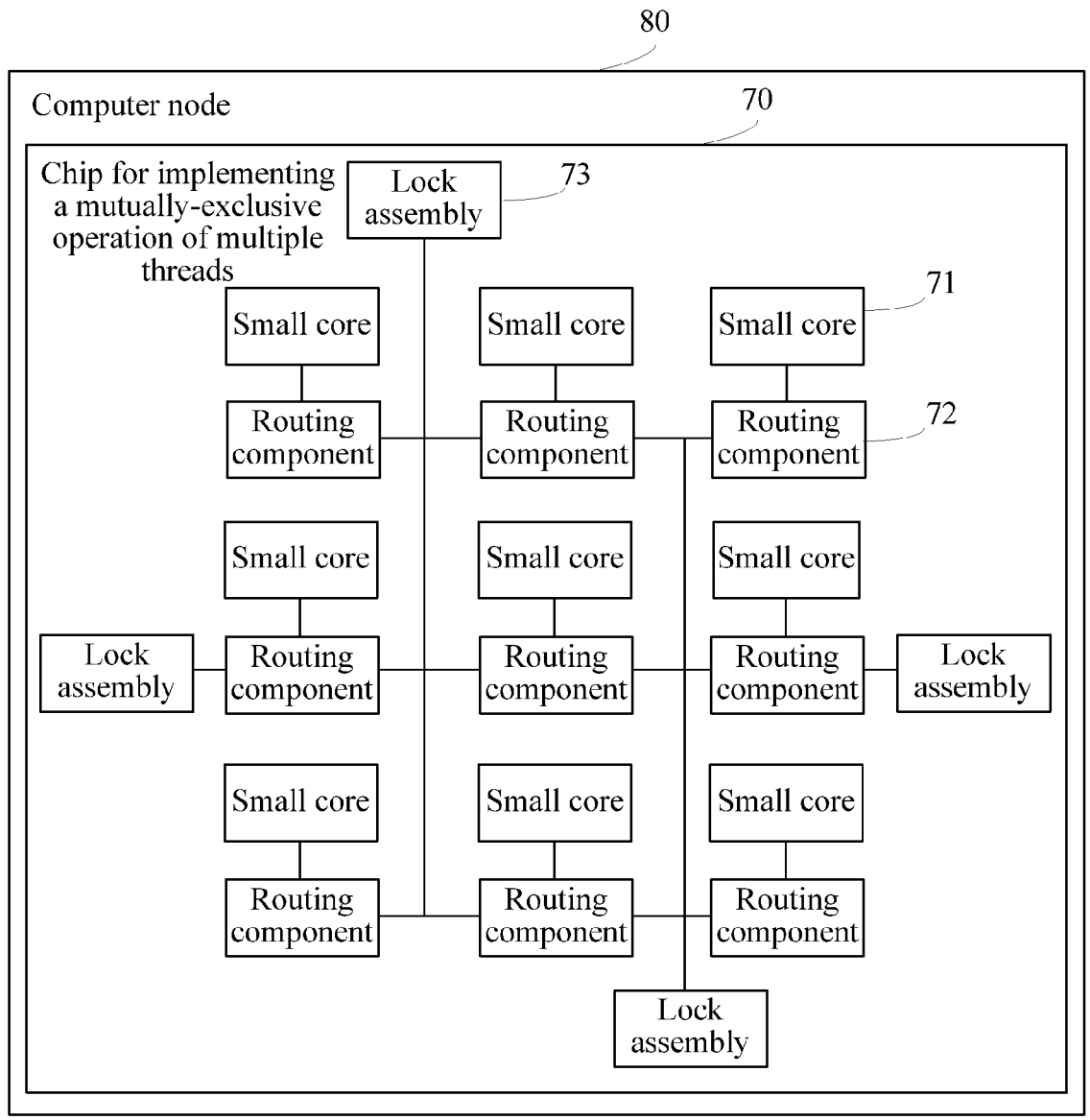
FIG. 8 shows a computer node according to an embodiment of the present invention.

This embodiment of the present invention further provides a computer node 80. Specifically, as shown in FIG. 8, the computer node 80 includes a chip 70 for implementing a mutually-exclusive operation of multiple threads.

The chip 70 is configured to implement a mutually-exclusive operation of multiple threads, and includes a small core 71, a routing component 72, and a lock assembly 73.

The routing component 72 is configured to receive a lock message sent by the small core 71, where the lock message carries a memory address corresponding to a lock requested by a first thread in the small core 71, and the lock message is a lock application message or a lock release message.

The routing component 72 is further configured to calculate, by using the memory address of the requested lock, a code number of the lock assembly 73 to which the requested lock belongs.

The routing component 72 is further configured to send the lock message to the lock assembly 73 corresponding to the code number.

The lock assembly 73 is configured to receive the lock message sent by the routing component 72.

The lock assembly 73 is further configured to process the lock message.

Specifically, the method for the chip 70 to implement a mutually-exclusive operation of multiple threads may be referred to the description in Embodiment 2, which is not repeated in this embodiment of the present invention.

This embodiment of the present invention provides a computer node, where the computer node includes: the chip for implementing a mutually-exclusive operation of multiple threads in Embodiment 4. The chip includes a small core, a routing component, and a lock assembly. First, the routing component receives a lock message sent by a small core, where the lock message carries a memory address corresponding to a lock requested by a first thread in the small core; next, the routing component calculates, by using the memory address of the requested lock, a code number of a lock assembly to which the requested lock belongs; and then, the routing component sends the lock message to the lock assembly corresponding to the code number, to request the lock assembly to process the lock message. After receiving the lock message sent by the routing component, the lock assembly processes the lock message.

Based on the descriptions of the foregoing embodiment, when the computer node completes a mutually-exclusive operation of multiple threads, the problem of relatively great system overheads generated by accessing a flag bit outside a chip inside the computer node by a thread in a multi-core/many-core processor on the chip can be avoided; and also multiple lock assemblies storing a memory address corresponding to a lock are distributed on the chip inside the computer node, so that locks requested by threads are not centralized in a same component on the chip. Therefore, a congestion problem can be solved, a wait time of the threads can be reduced, and a speed of collaborative execution of the threads can be improved.

Embodiment 6

Figure 9:
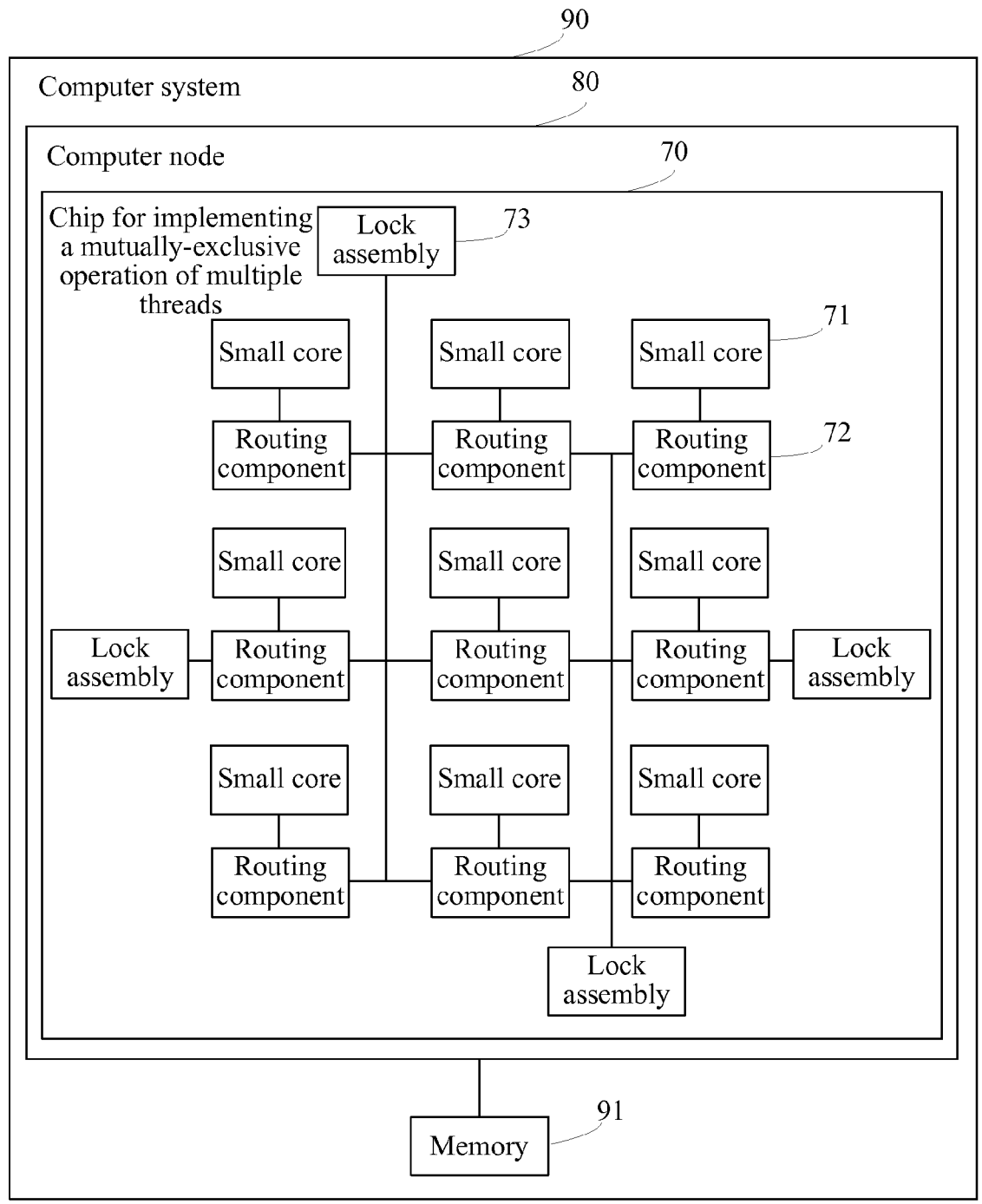
FIG. 9 shows a computer system according to an embodiment of the present invention.

This embodiment of the present invention provides a computer system 90. Specifically, as shown in FIG. 9, the computer system 90 includes a computer node 80 and a memory 91.

The memory 91 is configured to interact with the computer node 80 after a lock assembly 73 in a chip 70 receives a message acknowledging that the lock application is successful, to complete a read/write operation of a thread.

The computer node 80 is configured to implement a mutually-exclusive operation of multiple threads, and includes the chip 70 for implementing a mutually-exclusive operation of multiple threads.

The chip 70 includes a small core 71, a routing component 72, and the lock assembly 73.

The routing component 72 is configured to receive a lock message sent by the small core 71, where the lock message carries a memory address corresponding to a lock requested by a first thread in the small core 71, and the lock message is a lock application message or a lock release message.

The routing component 72 is further configured to calculate, by using the memory address of the requested lock, a code number of the lock assembly 73 to which the requested lock belongs.

The routing component 72 is further configured to send the lock message to the lock assembly 73 corresponding to the code number.

The lock assembly 73 is configured to receive the lock message sent by the routing component 72.

The lock assembly 73 is further configured to process the lock message.

Specifically, the method for the chip 70 to implement a mutually-exclusive operation of multiple threads may refer the description in Embodiment 2, which is not repeated in this embodiment of the present invention.

This embodiment of the present invention provides a computer system, where the computer system includes memory and the computer node in Embodiment 5, and the memory is configured to interact with the computer node after a lock assembly in a chip receives a message acknowledging that the lock application is successful, to complete a read/write operation of a thread. The computer node includes a chip for implementing a mutually-exclusive operation of multiple threads. The chip includes: a small core, a routing component, and a lock assembly. First, the routing component receives a lock message sent by the small core, where the lock message carries a memory address corresponding to a lock requested by a first thread in the small core; next, the routing component calculates, by using the memory address corresponding to the requested lock, a code number of the lock assembly to which the requested lock belongs; and then, the routing component sends the lock message to the lock assembly corresponding to the code number, to request the lock assembly to process the lock message. After receiving the lock message sent by the routing component, the lock assembly processes the lock message.

Based on the descriptions of the foregoing embodiment, when the computer system completes a mutually-exclusive operation of multiple threads, the problem of greater system overheads generated by accessing a flag bit outside a chip inside the computer system by a thread in a multi-core/many-core processor on the chip can be avoided; and also multiple lock assemblies storing a memory address corresponding to a lock are distributed on the chip inside the computer system, so that locks requested by threads are not centralized in a same component on the chip. Therefore, a congestion problem can be solved, a wait time of the threads can be reduced, and a speed of collaborative execution of the threads can be improved.

It should be noted that, the foregoing described apparatus embodiments are merely exemplary, where the units described as separate components may be or may not be separated physically, and the components displayed as units may be or may not be physical units, that is, may be located at one position, or may be distributed to multiple network units. Some or all modules thereof may be selected according to actual needs to implement the objectives of the solutions of the embodiments. In addition, in the accompanying drawings of the apparatus embodiments provided in the present invention, the connection relationship among modules represents that the modules are in communication connection, and specifically may be implement as one or more communications buses or signal lines. A person of ordinary skill in the art may understand and implement the present invention without creative efforts.

Through the foregoing descriptions of the implementation manners, a person skilled in the art may clearly understand that the present invention may be implemented in a manner of software plus necessary general hardware, and certainly may also be implemented by using dedicated hardware such as a dedicated integrate circuit, a dedicated CPU, a dedicated memory, or a dedicated component. In general, any function completed by a computer program may be easily implemented by using corresponding hardware, and a specific hardware structure used to implement the same function may also be various, such as an analog circuit, a digital circuit, or a dedicated circuit. However, for the present invention, in more cases, software program implementation is a preferred implementation manner. Based on such an understanding, the technical solutions of the present invention essentially or the part contributing to the prior art may be represented in a form of a software product, and the computer software product is stored in a readable storage medium, such as a floppy disk, a USB flash drive, a removable hard disk, a read-only memory (ROM, Read-Only Memory), a random access memory (RAM, Random Access Memory), a magnetic disk, or an optical disc that are of a computer, and includes several instructions to make a computer device (which may be a personal computer, a server, a network device, or the like) execute the methods of the embodiments of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
   receiving, by a routing component on a chip, a lock message sent by a small core, wherein the lock message carries a memory address corresponding to a lock requested by a first thread in the small core;

calculating, by the routing component using the memory address corresponding to the requested lock, a code number of a lock assembly to which the requested lock belongs, wherein the chip comprises a plurality of lock assemblies, each lock assembly of the plurality of lock assemblies includes a quantity of locks, and each lock assembly of the plurality of lock assemblies is configured to manage a lock application message for applying for a lock of the quantity of locks that belongs to the each lock assembly and a lock release message for releasing a lock of the quantity of locks that belongs to the each lock assembly, and wherein calculating the code number of a lock assembly to which the requested lock belongs, comprises calculating a remainder by dividing the memory address corresponding to the requested lock by a quantity of lock assemblies of a computer node, and using the remainder as the code number of the lock assembly to which the requested lock belongs; and sending, by the routing component, the lock message to a lock assembly corresponding to the calculated code number, to request the lock assembly to process the lock message.

2. The method according to claim 1, wherein:

information about the requested lock comprises the memory address corresponding to the requested lock, a state of the requested lock, a quantity and code numbers of threads waiting for the requested lock, a code number of a thread currently using the requested lock, and information indicating a next thread to acquire the requested lock;

the state of the requested lock is an idle state or an occupied state; and the sending the lock message to the lock assembly corresponding to the code number, to request the lock assembly to process the lock message, comprises:
  locating the information about the requested lock according to the memory address corresponding to the requested lock that is carried in the lock message;
  sending the lock message to the lock assembly corresponding to the calculated code number, to request the lock assembly to process the lock message according to the information about the requested lock; and
  updating the information about the requested lock.

3. The method according to claim 1, wherein:

information about the requested lock comprises the memory address corresponding to the requested lock, a state of the requested lock, a quantity of threads waiting for the requested lock, a code number of a thread currently using the requested lock, a vector indicating states of threads on a chip, and information indicating a next thread to acquire the requested lock;

the states of the threads on a chip comprise the thread is waiting for the requested lock or the thread is not waiting for the requested lock; and sending the lock message to the lock assembly corresponding to the code number, to request the lock assembly to process the lock message, comprises:
  locating the information about the requested lock according to the memory address corresponding to the requested lock that is carried in the lock message;
  sending the lock message to the lock assembly corresponding to the calculated code number, to request the lock assembly to process the lock message according to the information about the requested lock; and
  updating the information about the requested lock.

4. An apparatus on a chip, comprising:

a receiver, configured to receive a lock message sent by a small core, wherein the lock message carries a memory address corresponding to a lock requested by a first thread in the small core;

a computer-readable storage medium storing a program to be executed by a processor, the program including instructions for calculating, using the memory address corresponding to the requested lock, a code number of a lock assembly to which the requested lock belongs, wherein the chip comprises a plurality of lock assemblies, each lock assembly of the plurality of lock assemblies includes a quantity of locks, and each lock assembly of the plurality of lock assemblies is configured to manage a lock application message for applying for a lock that belongs to the each lock assembly and a lock release message for releasing a lock that belongs to the each lock assembly, and wherein calculating the code number of a lock assembly to which the requested lock belongs, comprises calculating a remainder by dividing the memory address corresponding to the requested lock by a quantity of lock assemblies of a computer node, and using the remainder as the code number of the lock assembly to which the requested lock belongs; and a transmitter, configured to transmit the lock message to the lock assembly corresponding to the calculated code number, to request the lock assembly to process the lock message.

5. The apparatus according to claim 4, wherein:

information about the requested lock comprises the memory address corresponding to the requested lock, a state of the requested lock, a quantity of and code numbers of threads waiting for the requested lock, a code number of a thread currently using the requested lock, and information indicating a next thread to acquire the requested lock, a state of the requested lock is an idle state or an occupied state; and transmitting the lock message to the lock assembly corresponding to the calculated code number, to request the lock assembly to process the lock message, comprises:
  finding the information about the requested lock according to the memory address corresponding to the requested lock that is carried in the lock message;
  transmitting the lock message to the lock assembly corresponding to the code number, to request the lock assembly to process the lock message according to the information about the requested lock; and
  updating the information about the requested lock.

6. The apparatus according to claim 4, wherein, information about the requested lock comprises the memory address corresponding to the requested lock, a state of the requested lock, a quantity of threads waiting for the requested lock, a code number of a thread currently using the requested lock, a vector indicating states of threads on a chip, and information indicating a next thread to acquire the requested lock, the states of the threads comprise the thread is waiting for the requested lock and the thread is not waiting for the requested lock; and transmitting the lock message to the lock assembly corresponding to the calculated code number, to request the lock assembly to process the lock message, comprises:
- locating the information about the requested lock according to the memory address corresponding to the requested lock that is carried in the lock message;
- transmitting the lock message to the lock assembly corresponding to the code number, to request the lock assembly to process the lock message according to the information about the requested lock; and
- updating the information about the requested lock.

7. A chip, comprising:
a small core;
a routing component, configured to:
- receive a lock message sent by the small core, wherein the lock message carries a memory address corresponding to a lock requested by a first thread in the small core;
- calculate, using the memory address corresponding to the requested lock, a code number of a lock assembly to which the requested lock belongs, wherein the chip comprises a plurality of lock assemblies, each lock assembly of the plurality of lock assemblies includes a quantity of locks, and each lock assembly of the plurality of lock assemblies is configured to manage a lock application message for applying for a lock that belongs to the each lock assembly and a lock release message for releasing a lock that belongs to the each lock assembly and, wherein calculating the code number of a lock assembly to which the requested lock belongs, comprises calculating a remainder by dividing the memory address corresponding to the requested lock by a quantity of lock assemblies of a computer node, and using the remainder as the code number of the lock assembly to which the requested lock belongs; and
- transmit the lock message to the lock assembly corresponding to the calculated code number, to request the lock assembly to process the lock message; and the lock assembly, configured to receive a lock message from the routing component and process the lock message.

8. The chip according to claim 7, wherein:
information about the requested lock comprises the memory address corresponding to the requested lock, a state of the requested lock, a quantity of and code numbers of threads waiting for the requested lock, a code number of a thread currently using the requested lock, and information indicating a next thread to acquire the requested lock;
the state of the requested lock is an idle state or an occupied state; and
transmitting the lock message to the lock assembly corresponding to the calculated code number, to request the lock assembly to process the lock message, comprises:
- locating the information about the requested lock according to the memory address corresponding to the requested lock that is carried in the lock message;
- transmitting the lock message to the lock assembly corresponding to the calculated code number, to request the lock assembly to process the lock message according to the information about the requested lock; and
- updating the information about the requested lock.

9. The chip according to claim 8, wherein the lock message is a lock application message and the lock message further carries a code number of the first thread; and
processing the lock message by the lock assembly comprises:
- searching for the information about the requested lock according to the memory address corresponding to the requested lock that is carried in the requested lock message;
- checking the state of the lock comprised in the information about the requested lock;
- determining whether a quantity of threads waiting for the requested lock is less than a maximum quantity of threads supported by the chip in response to determining that the state of the requested lock is an occupied state;
- writing the code number of the first thread into a code number field of the threads waiting for the requested lock and updating the quantity of the threads waiting for the lock, in response to determining that the quantity of threads waiting for the requested lock is less than the maximum quantity of threads supported by the chip; and
- writing the code number of the first thread into memory of the requested lock in response to determining that the quantity of threads waiting for the requested lock is not less than the maximum quantity of threads supported by the chip.

10. The chip according to claim 7, wherein,
information about the requested lock comprises the memory address corresponding to the requested lock, a state of the requested lock, a quantity of threads waiting for the requested lock, a code number of a thread currently using the requested lock, a vector indicating states of threads on a chip, and information indicating a next thread to acquire the lock,
the states of the threads comprise whether the thread is waiting for the lock; and
the transmitting the lock message to the lock assembly corresponding to the calculated code number, to request the lock assembly to process the lock message, comprises:
- locating the information about the requested lock according to the memory address corresponding to the requested lock that is carried in the lock message;
- transmitting the lock message to the lock assembly corresponding to the code number, to request the lock assembly to process the lock message according to the information about the requested lock; and
- updating the information about the requested lock.

11. A computer node, comprising the chip according to claim 7.

12. A computer system, comprising:
memory; and
the computer node according to claim 11.

* * * * *